United States Patent [19]

Thanos

[11] 4,105,462

[45] Aug. 8, 1978

[54] NON-CRYSTALLIZING ROSIN

[75] Inventor: Theologos E. Thanos, Charleston, S.C.

[73] Assignee: Westvaco Corporation, New York, N.Y.

[21] Appl. No.: 767,303

[22] Filed: Feb. 10, 1977

[51] Int. Cl.² ............................................. C08L 93/04
[52] U.S. Cl. .................................. 106/218; 260/97.5; 260/104
[58] Field of Search ............... 106/218, 237, 238, 240, 106/241; 252/367; 260/97.5, 104; 162/180

[56] References Cited

U.S. PATENT DOCUMENTS

| | | | |
|---|---|---|---|
| 2,369,125 | 2/1945 | Anderson | 260/104 |
| 2,572,035 | 10/1951 | Jordan et al. | 260/97.5 |
| 3,044,890 | 7/1962 | Boughton et al. | 260/97.5 |
| 3,780,012 | 12/1973 | Smith | 260/97.5 |

Primary Examiner—Lorenzo B. Hayes
Assistant Examiner—W. Thompson
Attorney, Agent, or Firm—Richard L. Schmalz; Ernest B. Lipscomb, III; Terry B. McDaniel

[57] ABSTRACT

Rosin can be rendered non-crystalline and maintain its characteristic chemical and physical properties by the addition of a hard rosin ester.

6 Claims, No Drawings

NON-CRYSTALLIZING ROSIN

BACKGROUND OF THE INVENTION

(1) Field of the Invention

This invention relates to non-crystallizing rosin. More particularly, this invention provides a rosin stabilized against crystallization by the addition of a hard rosin ester.

For most rosin uses, a product not having a tendency to crystallize is highly desirable. Crystalline rosin is more difficult to saponify, easily crystallizes out of solution during the preparation of varnishes and above all presents serious handling difficulties.

(2) The Prior Art

Prolonged heating or injections of steam with the addition of caustic are used to render crystalline rosin useful. This treatment is costly and leaves rosin with a darker color. Other methods used to reduce or prevent crystallization include heat treatment, partial neutralization with sodium hydroxide, polymerization, and reaction with formaldehyde or dienophiles. These methods, based mainly on changes in the rosin composition, involve alterations in the structure and chemical properties of the rosin acid molecules.

In U.S. Pat. No. 2,572,035 Jordan et al. partially esterify rosin with pentaerythritol to the extent that the acid number is reduced 25% to 50% and a liquid product is obtained. Barthel in U.S. Pat. No. 2,576,094 makes a non-crystallizing rosin suitable for making liquid rosin size, by heating rosin with phenothiazine. In U.S. Pat. No. 2,776,275 Strazdins describes stabilizing rosin against crystallization with a small amount of the condensation product of rosin with a saligenin. Eckhardt in U.S. Pat. No. 2,659,718 describes treatment of fatty acid-rosin mixtures to inhibit crystallization using alcohols and formaldehyde. Yet another method for preventing crystallization of rosin is described by Strizhakov, "Prevention of Rosin Crystallization," Gidroliznaya i Lesokhimicheskaya Promyshlennost' No. 7:9–10 (1975) and involves the addition to a rosin melt or to an oleoresin of 5% to 10% rosin anhyride or the treatment of rosin with acetic anhydride. Although the method of Strizhakov, like some of the other methods, is effective, it undesirably results in a substantial softening of the rosin.

It is, therefore, the general object of this invention to provide a non-crystallizing rosin with essentially the same physical properties as the starting rosin.

Another object of this invention is to provide a hard, homogeneous, readily liquifiable rosin in which a rosin ester has been added to a rosin melt.

Yet another object of this invention is to provide a method for making a hard, non-crystallizing rosin.

Other objects, features and advantages of this invention will be evident from the following detailed description of the invention.

SUMMARY OF THE INVENTION

It has been found that rosin can be rendered non-crystalline, and maintain its basic structure and general characteristic chemical and physical properties. The rosin composition of this invention retains its high abietic reactivity level, since the abietic acid content is not reduced. The non-crystalline rosin compositions of this invention involve the addition of small amounts, usually about 1% to about 12% by weight of hard rosin ester to a rosin melt.

DETAILED DESCRIPTION OF THE INVENTION

As stated, this invention is directed to non-crystallizing rosin compositions. It has thus been found that the addition of small amounts of a hard rosin ester to a rosin melt will prevent crystallization of the rosin. As the composition of rosin differs according to type and source, the minimum amount needed to prevent crystallization will vary. With some rosins as little as 1% by weight hard rosin ester will be effective to retard crystallization, but typically about 5% hard rosin ester is preferred. At the lower addition level the physical and chemical properties are only slightly if at all changed by the hard rosin ester. Because it is desirable for the rosin to retain its original chemical and physical characteristics, it is undesirable to add too much hard rosin ester or the properties will deteriorate. Although greater than 12% by weight addition levels of the hard rosin ester to the rosin melt effectively retards crystallization, major chemical and physical modifications of the rosin acids begin to occur, with about 10% addition being a preferred maximum. Because the starting properties, e.g., acid number and softening point, of rosin differ, an absolute value for properties of the rosin treated according to this invention is not available. However, what is meant by the rosins treated with hard rosin esters retaining approximately the same characteristics, is that these properties like acid number and softening point have not decreased more than 10% from the values of the starting rosin.

The rosins which may be used include tall oil rosin, wood rosin and gum rosin. When tall oil rosin is the rosin of choice, it is preferable that the rosin be distilled and thereby include less than 5% by weight of tall oil fatty acids.

It was found that the hard rosin ester formed in a rosin melt in situ is not as effective in retarding crystallization as if the rosin ester were made and added to the rosin melt separately. As shown hereinafter in the examples, the crystalline-retarded rosin possesses approximately the same physical and chemical properties as the original rosin. Where rosin color is an important consideration, a conventional color stabilizer may be added to the rosin melt. It has been established that the addition of the color stabilizer to the rosin melt has no effect on crystal prevention.

To make the rosin compositions of the present invention, a hard rosin ester is first formed.

For rosin esterification, a variety of polyhydric alcohols resulting in a hard rosin ester may be used. Typical polyhydric alcohols include pentaerythritol, glycerol, trimethylolpropane, and other polyhydric alcohols resulting in a hard rosin ester product. The term "hard rosin ester" is defined as a rosin ester having a softening point of 150° F. or greater. The esterification reaction may be performed in any usual manner for esterifying polyhydric alcohols with rosin acids. For example, it has been found that the reaction may be very conveniently carried on as follows. The rosin is melted in a reaction vessel with the polyhydric alcohol at a temperature between 500° and 550° F. An esterification catalyst may also, if desired, be added. The reaction is carried out over a period of 3 to 6 hours at a temperature around 500° F. for a couple of hours, followed by continued heating at 550° F. until the reaction is completed. The material is then cooled and ready for use.

The non-crystalline rosin is prepared by melting the rosin at approximately 400° F., adding the rosin ester and mixing for 20 to 25 minutes to obtain a homogeneous mass. The crystallization may be easily observed by visual examination; see Table I, Note 4.

The products obtained using the above-described hard rosin ester eliminate crystallization and result in products having approximately the same acid number, softening point and color as the original starting rosin material. The products of this invention can be contrasted with other rosin products in which the percentage reduction in acid value, softening point and color varies greatly. The rosin compositions of the present invention are light colored, hard, non-crystalline materials which readily liquify upon application of heat. They are useful in the manufacture of adhesives, coatings, soap, rubber compounds and specialties.

The following examples are illustrative of the practice of this invention.

EXAMPLE 1

A rosin ester of pentaerythritol was prepared according to the following method. Tall oil rosin (26.9 pounds) was placed in a 10-gallon Brighton kettle along with 3 pounds of pentaerythritol and 271 grams of esterification catalyst. The reaction mixture was heated to 530° F. for 2 hours, followed by continued heating at 550° F. for an additional 3 hours. Continuous sparging with nitrogen was employed throughout the reaction. Upon cooling the rosin ester had an acid number of 10.2, a Gardner color of 5+ and a softening point of 210.5° F.

EXAMPLE 2

A rosin ester of trimethylolpropane was prepared using the same procedure of Example 1. The following amounts of materials were used: 25.4 pounds of tall oil rosin, 2.8 pounds of trimethylolpropane and 256 grams of esterification catalyst. Upon cooling the rosin ester had an acid number of 13.4, a Gardner color of 4½ and a softening point of 178.5° F.

EXAMPLE 3

A series of rosins of the present invention were prepared by the following method. The rosin and the rosin ester as shown in Table I below were heated to about 400° F. for 20-25 minutes in order to melt the mixture and permit satisfactory blending. After thorough blending, the compositions were allowed to cool and harden. The effects of crystallization and physical properties are shown in Table I. The following esters were used: pentaerythritol rosin ester from Example 1 having a softening point of 210.5° F.; trimethylolpropane rosin ester from Example 2 having a softening point of 178.5° F.; and glycerol rosin ester having a softening point of 153.5° F.

The Rosin Crystallization Test was as follows: Ten (10) grams of rosin were crushed into lumps (approximately ⅛-¼ inches) and placed in a large test tube (200 mm. × 22 mm. dia.), and rosin dust was avoided as completely as possible. Ten (10) milliliters of acetone were added and the time noted; lastly, the time required for crystals to begin forming on the rosin was observed and compared against a blank.

TABLE I

| Run No. | Rosin | Rosin Ester | Amount (%) | Remarks on Crystallization[4] | Acid Number | Softening Point (° F.) A.S.T.M. Ball and Ring |
| --- | --- | --- | --- | --- | --- | --- |
| Blank | Tall Oil | — | — | Yes | 178.6 | 167.0 |
| 1 | Tall Oil | Penta[1] | 5 | Slight to None | 169.2 | 167.5 |
| 2 | Tall Oil | Penta[1] | 7 | None | 166.4 | 168.0 |
| 3 | Tall Oil | Penta[1] | 10 | None | 162.7 | 169.0 |
| 4 | Tall Oil | Penta[1] | 15 | None | 151.9 | 170.5 |
| Blank | Tall Oil | — | — | Yes | 177.5 | 162.0 |
| 5 | Tall Oil | TMP[2] | 5 | Slight to None | 169.8 | 160.5 |
| 6 | Tall Oil | TMP[2] | 7 | None | 168.5 | 161.0 |
| 7 | Tall Oil | TMP[2] | 10 | None | 161.2 | 160.0 |
| 8 | Tall Oil | TMP[2] | 15 | None | 150.9 | 161.0 |
| Blank | Tall Oil | — | — | Yes | 176.8 | 166.0 |
| 9 | Tall Oil | Glycerol[3] | 5 | Slight | 168.9 | 159.5 |
| 10 | Tall Oil | Glycerol[3] | 7 | Slight to None | 166.6 | 159.0 |
| 11 | Tall Oil | Glycerol[3] | 10 | Slight to None | 161.6 | 153.5 |
| 12 | Tall Oil | Glycerol[3] | 15 | None | 156.0 | 153.5 |

Notes:
[1]Pentaerythritol rosin ester from Example 1.
[2]Trimethylolpropane rosin ester from Example 2.
[3]Glycerol rosin ester.
[4]Remarks as to the degree of crystallization are the results of visual observations: 1) of the actual crystals present in the rosin metal containers, and 2) of a rosin crystallization test designed to evaluate the degree of effectiveness of the rosin ester additives on crystal retardation.

From the table it can be seen that where between 5% and 10% hard rosin ester was added crystallization was effectively retarded with acid number and softening point remaining approximately the same as the starting material. It will be noted that as the softening point of the hard rosin ester approaches 150° F. the less effective it becomes at retarding crystallization as noted by the glycerol ester having a softening point of 153.5° F.

EXAMPLE 4

This example illustrates the effectiveness of a hard rosin ester on wood rosin. The pentaerythritol ester from Example 1 was added to a melted (at about 400° F.) wood rosin and blended. After cooling, the properties of the rosin and its tendency to crystallize were determined and the results are shown in Table II.

TABLE II

| Rosin | Rosin Ester | Amount Rosin Ester (%) | Remarks on Crystal- lization[2] | Acid Number | Softening Point (° F.) A.S.T.M. Ball and Ring |
|---|---|---|---|---|---|
| Wood | None | — | — | 146.4 | 167.0 |
| Wood | Penta[1] | 7 | None | 140.2 | 177.0 |
| Wood | Penta[1] | 10 | None | 137.5 | 176.0 |

Notes:
[1] Pentaerythritol rosin ester from Example 1.
[2] Remarks as to the degree of crystallization are the results of visual observations: 1) of the actual crystals present in the rosin metal containers, and 2) of a rosin crystallization test designed to evaluate the degree of effectiveness of the rosin ester additives on crystal retardation.

Although wood rosin is typically considered to be non-crystalline, a further retardation of crystallization was achieved by the Penta rosin ester addition, as judged by the rosin crystallization test.

EXAMPLE 5

As stated, rosins from different sources have somewhat different chemical and physical characteristics. In this example, another tall oil rosin was blended with various amounts of pentaerythritol ester from Example 1. The results are shown in Table III.

TABLE III

| Rosin | Rosin Ester | Amount Rosin Ester (%) | Remarks on Crystal- lization[2] | Acid Number | Softening Point (° F.) A.S.T.M. Ball and Ring |
|---|---|---|---|---|---|
| Tall Oil | None | — | Yes | 171.1 | 154.0 |
| Tall Oil | Penta[1] | 1 | Slight to None | 167.0 | 154.5 |
| Tall Oil | Penta[1] | 2 | None | 164.7 | 156.5 |
| Tall Oil | Penta[1] | 3 | None | 164.2 | 158.0 |
| Tall Oil | Penta[1] | 4 | None | 162.3 | 157.0 |
| Tall Oil | Penta[1] | 5 | None | 159.3 | 157.0 |

Notes:
[1] Pentaerythritol rosin ester from Example 1.
[2] Remarks as to the degree of crystallization are the results of visual observations: 1) of the actual crystals present in the rosin metal containers, and 2) of a rosin crystallization test designed to evaluate the degree of effectiveness of the rosin ester additives on crystal retardation.

Using this particular tall oil rosin, the addition of only 1% hard rosin ester tended to reduce crystallization while only 2% completely retarded crystallization without significantly changing the acid number and softening point.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A hard, non-crystallizing rosin composition comprising a distilled tall oil rosin containing less than 5% by weight fatty acids and an amount of hard rosin ester sufficient to prevent crystallization wherein said hard rosin ester is produced by mixing and reacting a composition consisting essentially of rosin and a member of the group consisting of pentaerythritol, trimethylolpropane and glycerol, said hard, non-crystallizing rosin having approximately the properties of the starting rosin.

2. The rosin composition of claim 1 wherein said hard rosin ester is added in an amount from about 1% to about 12% by weight of said rosin.

3. The rosin composition of claim 1 wherein said hard rosin ester is added in an amount from about 5% to about 10% by weight of said rosin.

4. A method of making a hard, non-crystallizing rosin composition comprising mixing molten distilled tall oil rosin containing less than 5% by weight fatty acids with a sufficient amount of hard rosin ester to produce a rosin which upon cooling is non-crystallizing and has approximately the properties of the starting rosin wherein said hard rosin ester is produced by mixing and reacting a composition consisting essentially of rosin and a member of the group consisting of pentaerythritol, trimethylolpropane and glycerol.

5. The method according to claim 4 wherein said hard rosin ester is added in an amount from about 1% to about 12% by weight of said rosin.

6. The method according to claim 4 wherein said hard rosin ester is added in an amount from about 5% to about 10% by weight of said rosin.

* * * * *